United States Patent [19]
Rubin

[11] Patent Number: 5,530,741
[45] Date of Patent: Jun. 25, 1996

[54] METHOD FOR PROVIDING INTER-LATA CALLER IDENTIFICATION

[75] Inventor: Robert M. Rubin, Morristown, N.J.

[73] Assignee: AT&T Corp., Murray Hill, N.J.

[21] Appl. No.: 156,557

[22] Filed: Nov. 23, 1993

[51] Int. Cl.⁶ .......................... H04M 1/56; H04M 15/00; H04M 3/42; H04M 3/00
[52] U.S. Cl. .......................... 379/142; 375/127; 375/201; 375/245
[58] Field of Search ..................................... 375/112, 115, 375/114, 127, 142, 201, 207, 245, 296, 247, 229, 127

[56] References Cited

U.S. PATENT DOCUMENTS

| | | | |
|---|---|---|---|
| 4,922,490 | 5/1990 | Blakley | 379/142 X |
| 5,018,191 | 5/1991 | Catron et al. | 379/207 X |
| 5,023,904 | 6/1991 | Kaplan et al. | 375/142 X |
| 5,163,087 | 11/1992 | Kaplan | 375/142 X |

*Primary Examiner*—Stephen Chin
*Assistant Examiner*—Paul Loomis
*Attorney, Agent, or Firm*—Eugene J. Rosenthal

[57] ABSTRACT

Caller identification information, e.g., the calling party number, is provided on a selective basis by the network of a carrier that does not directly contact the called subscriber at all, such as an interexchange carrier, to the next carrier carrying the call. For example, an interexchange carder would supply the calling party number to the local exchange carder (LEC) connected to a called party for an inter-LATA (long distance) call only if the called party subscribed to the interexchange carrier's inter-LATA caller identification (ID) service. Otherwise, the interexchange carder suppresses the calling party number, so that it is not supplied to the LEC. When the calling party number is supplied by the interexchange carder, the LEC would merely need to forward the number to the called station set. Such a system allows the interexchange carrier to control the providing of services that it heretofore could only assist in providing.

15 Claims, 4 Drawing Sheets

FIG.3

TERMINATING NUMBER  341

| (201) 123-4567 |
| (201) 234-5678 |
| ⋮ |
| (201) XXX-XXXX |
| (408) 345-6789 |
| (408) 456-7891 |
| ⋮ |
| (408) XXX-XXXX |
| (500) 123-4567 |
| ⋮ |
| (500) XXX-XXXX |
| (908) 123-4567 |
| (908) 567-8912 |
| ⋮ |
| (908) XXX-XXXX |

FIG. 4

| SUBSCRIBER TELEPHONE NUMBER | INTER-LATA CALLER IDENTIFICATION SUBSCRIPTION |
|---|---|
| (201) 123-4567 | 1 |
| (201) 234-5678 | 1 |
| ⋮ | ⋮ |
| (201) XXX-XXXX | 0 |
| (408) 345-6789 | 1 |
| (408) 456-7891 | 0 |
| ⋮ | ⋮ |
| (408) XXX-XXXX | 1 |
| (500) 123-4567 | 0 |
| ⋮ | ⋮ |
| (500) XXX-XXXX | 0 |
| (908) 123-4567 | 0 |
| (908) 567-8912 | 1 |
| ⋮ | ⋮ |
| (908) XXX-XXXX | 0 |

METHOD FOR PROVIDING INTER-LATA CALLER IDENTIFICATION

TECHNICAL FIELD

This invention relates to the providing of caller identification on an inter-LATA basis.

BACKGROUND OF THE INVENTION

In the United States, while some telephone calls are handled by one service provider, e.g., a local call completed between wired (as opposed to wireless) telephone stations, many calls, e.g., long-distance calls, require multiple service providers to cooperate for their completion. The initial carrier providing telephone service is typically a local service provider, illustratively a local exchange carder (LEC), such as New Jersey Bell. However, the term "local service providers", as used herein, also includes cellular (wireless), cable and any so-called "dial-tone "or "first contact service" provider. Such local service providers are also, typically, the network of last contact for a call, because they are connected to the called subscriber, where the call exits the public network.

The network connecting the network of first contact with the network of last contact is typically, but not necessarily, that of a long-distance—or so-called interexchange (IXC)—telephone carrier. In the United States, AT&T, MCI and Sprint are three such IXCs. For example, presently, for a long-distance telephone call between wired telephone subscribers, the local service providers serving the calling and called telephones are two different LECs which are interconnected by a long-distance, or interexchange, carder.

In some call scenarios, there are only two networks connected together, the network of first contact and the network of last contact. For example, for a local call from a mobile telephone to a wired telephone station, the network of first contact is a cellular service provider while the network of last contact is a LEC connecting the network of the cellular service provider to a called party at the wired telephone station, both networks being those of local service providers. Thus, it is possible for a telecommunications carrier to serve multiple roles.

Presently, caller-identification, where information identifying the telephone number of the calling station is transmitted to the called station, is provided only by the network of last contact to the called subscriber. The network of last contact is typically the network of the local exchange carrier (LEC) that is directly connected to the called station set. Therefore, caller identification is only available on an intra-LATA basis, i.e., within the area that can be served by a LEC without involving an interexchange carrier (IXC). It has been a goal of the art, however, to provide advanced telephone features such as caller identification, on an inter-LATA basis, thereby allowing such features to be extended to nationwide functionality.

Indeed, it is envisioned by those skilled in the art that nationwide advanced telephone features will be provisioned and administered by the LECs who will, if necessary, contract or obtain certain functions from the interexchange carriers (IXCs). For example, the LECs will contract with the IXCs for the latter to provide the LEC with the calling party number (CPN) for each call. At present, this information is not provided to the LECs at all. The LEC will then determine if the called party was a subscriber to inter-LATA caller-ID and, if so, cause signals representing the calling party's telephone number to be sent to the called station set. However, such a system is wasteful of capacity in the IXC-LEC interface, in that it causes the IXC to transmit the calling party information for each call, while the information is only delivered to the subset of customers who subscribe to inter-LATA caller-ID.

SUMMARY OF THE INVENTION

I have recognized that the providing of caller identification on an inter-LATA basis need not be under the control of the network of last contact to the called subscriber, e.g., a LEC. Instead, in accordance with the principles of the invention, caller identification information, e.g., the calling party number, is provided on a selective basis to the carrier next carrying the call by the network of a carder, such as an interexchange carrier, that is not the network of last contact, i.e., it does not directly contact the called subscriber. One method for doing so is to a) store information in the network of a carder that is not the carder of last contact which indicates that particular subscribers have subscribed to services requiring delivery of the calling party number when those subscribers are called, b) for each incoming call, looking up the called subscriber in the stored information to see if that subscriber has subscribed to a feature that requires delivery of the calling party number, and c) supplying signals indicating the identity of the calling party of the call from the network not of last contact to the next public network to which the call is to be routed only when the called party has subscribed to at least one of the features requiting delivery of the calling party's number. The last mentioned step can, if desired, be modified so that the system is arranged as a default to supply the signals but the supplying of signals is suppressed when the called party has not subscribed to any feature requiring delivery of the calling party's number For example, an interexchange carder would supply the calling party number to the LEC connected to a called party for an inter-LATA call only if the called party subscribed to the interexchange carrier's inter-LATA caller-ID service. Otherwise, the interexchange carrier suppresses the calling party number, so that it is not supplied to the LEC. When the calling party number is supplied by the interexchange carrier, the LEC merely needs to forward the number to the called station set.

Advantageously, such a system reduces the volume of wasted traffic at the interface between the network of last contact and the previous network, since only calling party numbers that are actually used to benefit the called party are transmitted. The system also allows the interexchange carrier to control the providing of services that it heretofore could only assist in providing.

BRIEF DESCRIPTION OF THE DRAWING

In the drawing:

FIG. 3 shows an exemplary destination number (DN) trigger table, stored in a common platform adjunct shown in FIG. 1, in which the telephone numbers of feature or service subscribers are listed; and FIG. 4 shows exemplary "inter-LATA caller identification" table, in which is stored the information necessary to determine if a terminating subscriber has subscribed to the inter-LATA caller identification feature.

DETAILED DESCRIPTION

The invention particularly relates to long-distance—or so-called interexchange—calls, which involve the use of the facilities of a long-distance, or interexchange, carder, also referred to as an IXC. In the United States, for example, AT&T, MCI and Sprint are three such IXCs. Each subscriber to local telephone service from a local exchange carder, or LEC, such as New Jersey Bell, has associated with his telephone line a "primary interexchange carrier," or PIC, that was selected by or for the local subscriber. The local subscriber is said to be "PIC'd" to the associated IXC.

When a subscriber initiates a long-distance call without entering any access code that identifies an IXC, the call is routed through the network of the originating subscriber's LEC, over the network of the PIC and, ultimately, through the network of the LEC which has as one of its subscribers the terminating subscriber. Similarly, if a subscriber initiates a long-distance call and prefixes the terminating telephone number by an access code that identifies an IXC, the call is routed through the network of the originating subscriber's LEC, over the network of the IXC specified by the access code and, ultimately, through the network of the LEC which has as one of its subscribers the terminating subscriber.

Figure 1:
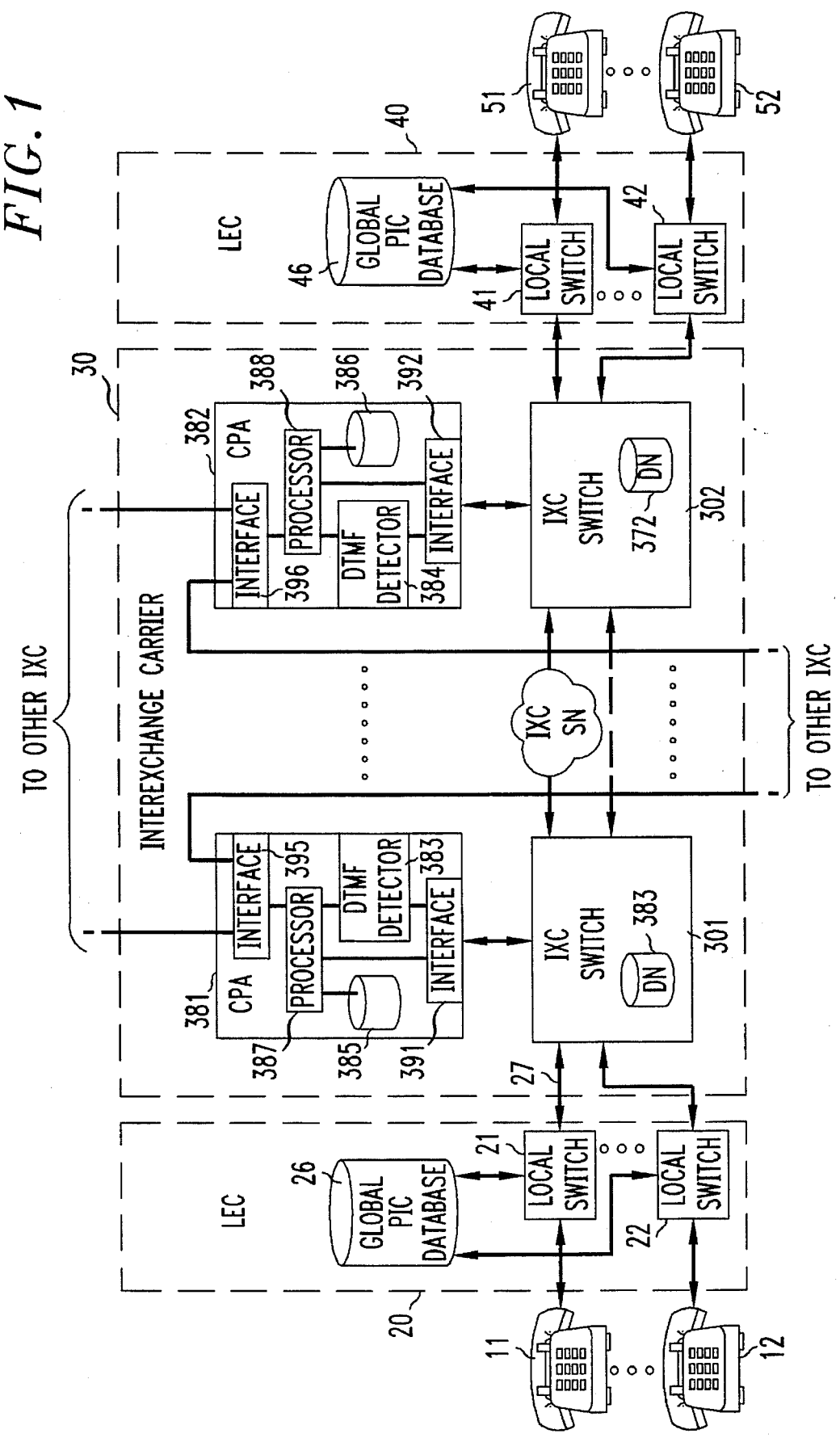
FIG. 1 shows an exemplary system for providing the inter-LATA caller identification feature, in accordance with the principles of the invention.

In FIG. 1, a plurality of telephone subscribers 11 . . . 12 are provided with local exchange service by local exchange carrier (LEC) 20. LEC 20 includes a plurality of local central office switches 21 . . . 22 which serve respective ones of the subscribers. When a long-distance call is originated by one of the subscribers, say subscriber 11, the associated local switch 21 recognizes from the dialed telephone number—specifically the area code thereof—that this is, indeed, a long-distance call. As a part of the processing of this call, if no IXC access code is dialed, switch 21 accesses data base 26 in which is stored an identification of the primary interexchange carrier, or PIC, for each of the LEC's subscribers. Inasmuch as data base 26 has PIC information relating to all the interexchange carriers, or IXCs, to which it has access, the data base is referred to herein as the "global" PIC data base.

In this example, subscriber 11 is PIC'd to IXC 30. That is, IXC 30 is that subscriber's selected primary interexchange carrier. IXC 30 includes a network of interexchange carrier switches which are illustratively AT&T 4ESS™ switches. The call is routed by local switch 21 to IXC 30 over link 27 and, more particularly, to originating switch 301 therein. In one embodiment of the invention, link 27 contains all that is necessary to achieve a voice connection and a signaling connection between local switch 21 and originating switch 301, including the providing of information identifying the originating telephone station, e.g., for supplying the telephone number of the calling party. Within the network of IXC 30, the call is ultimately routed to IXC terminating switch 302. In being carried over the network, the call may have also been directed, for example, across various trunks and through various switching nodes (not shown), as is well known in the art.

Also shown in FIG. 1 is LEC 40, which has as one of its subscribers the subscriber to which the call in question is being directed. Similar to LEC 20, LEC 40 includes local switches 41 . . . 42 which serve respective LEC subscribers 51 . . . 52, as well as a global PIC data base 46, which is used when outgoing long distance calls are made by subscribers 51 . . . 52. In this example, the terminating subscriber is subscriber 51.

IXC switches 301 and 302 are interfaced to respective ones of common platform adjuncts (CPAs) 381 . . . 382. CPAs are processors designed to supplement the functionality available with already existing IXC switches so that together they can provide features and services that such switches could not otherwise provide without significant redesign. One such service, the "inter-LATA caller identification" service, permits a subscriber to receive an indication of the telephone number of the telephone line from which the caller's call originated. It is noted that new switches could be designed to have the functionality of a common platform adjunct built in.

CPA 382, an exemplary CPA, contains processor 388, which controls the operation of the CPA, connected to dual tone multi-frequency (DTMF) detector 384, data base 386 and interfaces 392 and 396. Data base 386 stores the program code and dam necessary for operating CPA 382, including the program code and data for providing the inter-LATA caller identification feature in accordance with the principles of the invention. Interface 396 is a unit for connecting with the CPAs of other IXCs for coordinating the providing of inter-LATA long distance, as discussed further below. In particular, interface 396 is connected to links 398, which are communication links that are connected at their far end (not shown) to CPAs of other IXCs, and carry information in a form that is understandable by interface 396.

Interface 392 includes terminations for both voice channels and a signaling channel that pass between CPA 382 and IXC switch 372. In one embodiment, the connection between CPA 382 and IXC switch 372 is an Integrated Services Digital Network (ISDN) Primary Rate Interface (PRI) which provides 23 voice (B) channels and one data (D) channel associated with the voice channels. Optionally, interface 392 can supply alerts, e.g., tones or voice messages, over the voice channels. Interface 392 is connected to dual tone multi-frequency (DTMF) detector 384. Dual tone multi-frequency (DTMF) detector 384 can detect and transmit to processor 388 a decoded value for dual tone multi-frequency signals received on the channel terminated at interface 392. Interface 392 communicates messages between IXC switch 382 and CPA 382 to and from processor 388.

Each IXC switch has, for use when it is a terminating switch, a respective one of destination number (DN) trigger tables 371 . . . 372 in which are listed the telephone numbers of subscribers who subscribe to features or services that require a common platform adjunct (CPA) to provide at least some functionality for their implementation. FIG. 3 shows an exemplary DN trigger table in which the telephone numbers 341 of feature or service subscribers are listed in numerical order by area code and number. It is noted that a DN trigger table is not necessary if all calls terminated by IXC switch 372 are muted to CPA 382.

FIG. 4 shows exemplary "inter-LATA caller identification" table 351, in which is stored the information necessary to determine if a terminating subscriber has subscribed to the inter-LATA caller identification feature. The subscriber's telephone number, stored in subscriber telephone number field 353, is stored in association with a bit in inter-LATA caller identification subscription field 355. A "1" in inter-LATA caller identification subscription field 355 indicates that the associated subscriber listed in subscriber telephone number field 353 has subscribed to the inter-LATA caller identification feature. Conversely, if a subscriber's telephone number in subscriber telephone number field 353 is associated with a "0" in inter-LATA caller identification subscription field 355, that subscriber has not subscribed to the "inter-LATA caller identification" service, although there may be other services provided by CPA 382 to which he has subscribed. It is noted that XXX-XXXX is a representation indicating the last number stored for any particular area code.

For the call placed from subscriber 11 to subscriber 51, IXC terminating switch 302 tests to determine if the telephone number of subscriber 51 is listed in its DN trigger table. If the terminating subscriber number is not listed, IXC terminating switch 302 routes the call to local switch 41 which, in turn, passes the call to the telephone line of its terminating subscriber 51. A connection between subscribers 11 and 51 without the inter-LATA caller identification feature is thus made, the connection including both LECs and the IXC, in the conventional manner.

However, if the terminating subscriber number is listed in DN trigger table 372 of IXC terminating switch 302, then IXC terminating switch 302 queries CPA 382 by sending it to the called party number, i.e., the telephone number of the terminating subscriber. CPA 382 looks up the features and services that it is to provide for the terminating party number. If "inter-LATA caller identification" service is to be provided, as indicated by a "1" entry in field 355 for the terminating party number in subscriber's telephone line field 353, CPA 382 causes IXC terminating switch 302 to supply signals representing the telephone number of the calling party to local switch 41, in accordance with an aspect of the invention. Local switch 41 can then forward the telephone number of the calling party to subscriber 51, the called party.

Figure 2:
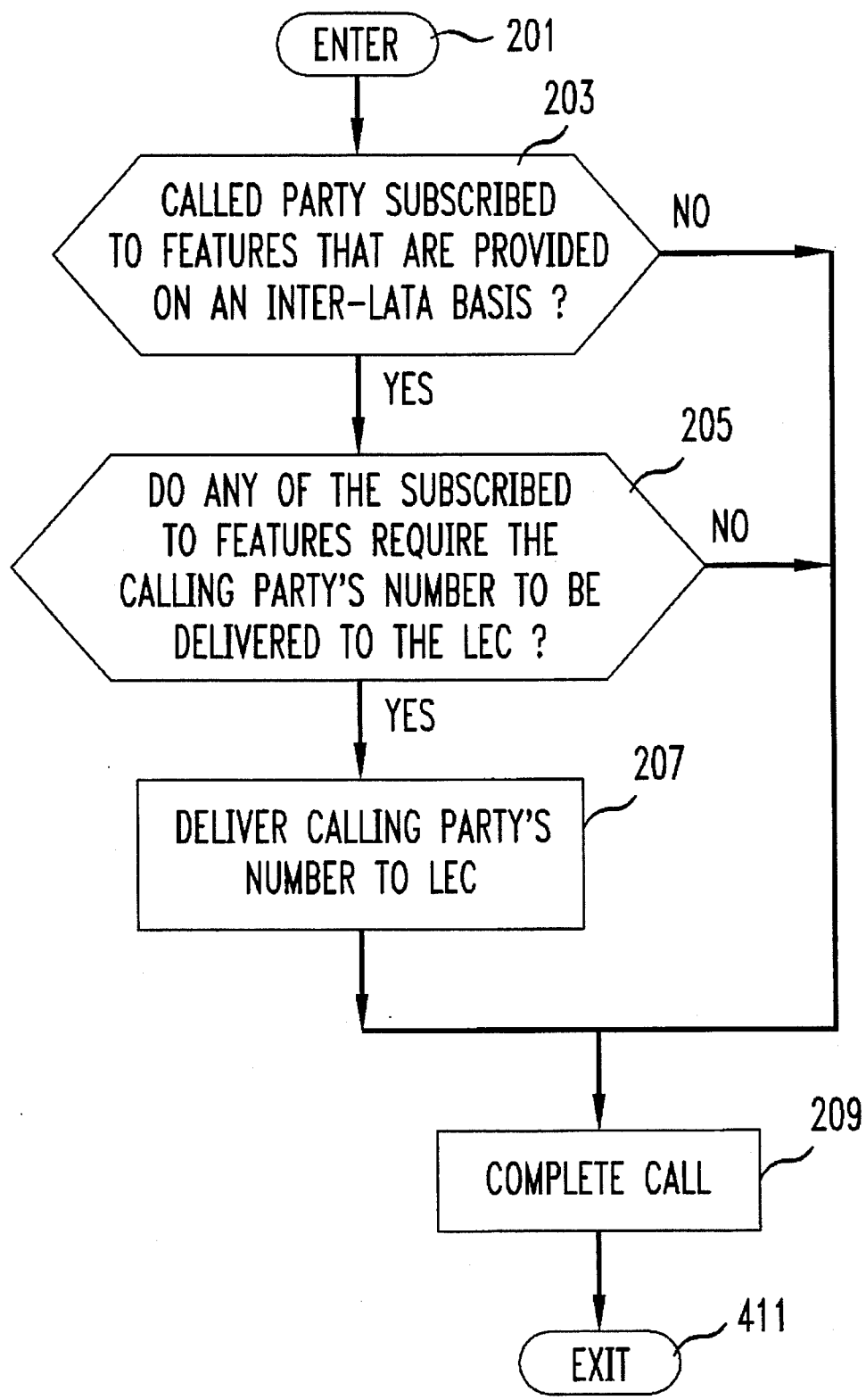
FIG. 2 shows a flow chart of an exemplary process for controlling the delivery of the called party number by an IXC in accordance with the principles of the invention.

FIG. 2 shows a flow chart of an exemplary process for controlling the delivery of the called party number by an IXC in accordance with the principles of the invention. The process is entered in step 201, when a call arrives at a switch associated with a processor that handles called party features, e.g., CPA 382. Next, conditional branch point 203 tests to determine if the called party is a subscriber to any features that are to be provided on an inter-LATA basis. If the test result in step 203, is YES, control passes to step 205, which tests to determine if any of the features to which the called party subscribed is a feature for which the calling party number must be given to the network of the carrier to which the IXC will next route the call, e.g., LEC 40.

If the test result in step 205 is YES, control passes to step 207, in which the calling party number is delivered by the IXC to the network of the carrier to which the IXC will next route the call, e.g., LEC 40, in accordance with an aspect of the invention. Control then passes to step 209, in which the IXC completes the call, at least as far as the next network to which the call is to be routed. The process is then exited in step 211.

If the test result in either of steps 203 or 205 is NO, control passes directly to step 209. In accordance with the principles of the invention, the calling party number is not passed on to the network of the carrier to which the IXC will next route the call, e.g., LEC 40. In other words, the IXC withholds the number of the calling party, which is available to it, from the next network. The process then continues at step 209 as described above.

One of the difficulties with the aforementioned system is that it requires cooperation among all the various IXCs in order to provide the calling party number to every LEC subscriber who subscribes to a feature that needs it. This is because the calling party number is supplied via an IXC based subscription system. Thus, an incoming call to a LEC subscriber over the network of an IXC that is not the IXC with which the subscriber has subscribed, for example, to the inter-LATA caller identification feature, such an IXC will not know that for the called subscriber's benefit the calling party's number is to be supplied to the LEC.

To overcome this difficulty, each IXC can provide to the other IXCs, via interfaces 395 . . . 396, a list of subscribers who should receive the calling party number. They may further provide a list of subscribers who should receive a particular type of call feature treatment.

To avoid the possibility of one IXC attempting to access the telephone numbers of subscribers supplied by a competing IXC, which represents that IXC's valuable subscribers who have subscribed to inter-LATA calling services, that part of data base 386 into which the data is stored can be locked so that only data entry made be made via interface 396. In such an embodiment, IXC switch 302 would route all incoming calls to CPA 382. Alternatively, other data security arrangements may be made. For example, that portion of data base 386 into which the data is stored can be placed under the control of an independent third party. Again, in such an embodiment, IXC switch 302 would route all incoming calls to CPA 382.

In one embodiment of the invention, the local switch connected to the called party may forward the telephone number of the calling party when it is supplied by an IXC through which the call was routed only when the called party is also a subscriber to the local caller identification feature.

In other embodiments of the invention, the functionality incorporated in the, CPA may instead be incorporated into a network control point (NCP). Such a change will be readily apparent to those skilled in the art In one embodiment of the invention, where the called telephone number is the personal telephone number of the called party, and where the interexchange carrier attempts to reached the called party at telephones located several different locations until the call is answered or abandoned, the caller identification information may be supplied to more than one LEC, as the telephone at each location may be connected to a different LEC. However, the caller identification information will only be supplied to those telephones for which there is a subscription to the inter-LATA caller-ID feature with the IXC carrying the call. Because personal telephone numbers presently have unique characteristics, such as a special area code, so that they can be identified, such an embodiment may be more easily implemented using an NCP-like arrangement.

The foregoing merely illustrates the principles of the inventions. It will thus be appreciated that those skilled in the art will be able to devise various arrangements which, although not explicitly described or shown herein, embody the principles of the invention and are thus within its spirit and scope.

I claim:

1. A method for delivering information identifying the subscriber placing a call, said information being used to provide at least one feature to the called subscriber, said calling and called subscribers being connected via the sequential connection of at least two networks which include a first network of a first service provider and a second network of a second service provider, the method comprising the steps of:

maintaining a feature subscription list in the first of said at least two networks, said list associating subscribers with various call features, some of said call features requiring information identifying the telephone line of the calling subscriber to be transmitted from said first network to another of said at least two networks;

receiving at said first network a call destined for a particular subscriber who is directly connected to a network other than said first network; and withholding from said second network for said call all information identifying the calling subscriber as a function of both (i) an indication of the identity of the particular called subscriber and (ii) said feature subscription list.

2. A method for delivering caller identification information in an environment in which a call must pass through at least two interconnected public switched telephone networks which include a first public switched telephone network of a first service provider and a second first public switched telephone network of a second service provider, said first one of said at least two interconnected public switched telephone networks being a network other than the network of last contact for telephone calls from a calling party that pass through both of said networks to the called party, the method comprising the steps of:

looking up the called party for said call in information maintained in said first network to determine if there is stored therein an indication that the called party has subscribed to a feature requiring delivery of information identifying the originating telephone station of said call by said first network to said second network; and supplying, as part of said call, information identifying the originating telephone station from said first network to said second network only when it is determined that an indication is stored for the called party.

3. The invention as defined in claim 2 wherein said call is placed to a personal telephone number and said method further comprises the step of:

supplying information identifying the originating telephone station from said first network to a third network when it is determined that an indication is stored for the called party and said call is rerouted to said third network in an attempt to complete said call to said called party.

4. A method for providing features to callers in an environment in which a call must pass through at least two interconnected public switched telephone networks which include a first public switched telephone network of a first service provider and a second first public switched telephone network of a second service provider, the called party of said call being directly connected to the second one of said at least two interconnected public switched telephone networks, the method comprising the steps of:

making a determination during said call in said first network as to whether the telephone line of the called party is indicated as being subscribed to a feature requiring delivery of information identifying the originating telephone station by said first network to said second network; and supplying, during said call, information identifying the originating telephone station from said first network to said second network only when said determination is that the telephone line of the called party is indicated as being subscribed to a feature requiring delivery of identifying information by said first network to said second network.

5. The invention as defined in claim 4 wherein said call is placed to a personal telephone number and said method further comprises the step of:

repeating said making and supplying steps if said call is rerouted to a different telephone line in an attempt to complete said call to said called party.

6. A method for providing a caller identification feature in an environment in which a call must pass through at least two interconnected public switched telephone networks which include a first public switched telephone network of a first service provider and a second first public switched telephone network of a second service provider, said environment further being arranged so that signals indicating said caller identification information is provided during said call to the called party of said call who is directly connected to the second one of said at least two interconnected public switched telephone networks, the method comprising the steps of:

making a determination in said first network as to whether the called party is a subscriber to a caller identification feature provided by said first network;

supplying the calling party's telephone number from said first network to said second network whenever said determination is that the called party is a subscriber to said caller identification feature provided by said first network; and withholding the calling party's telephone number from said second network whenever said determination is that the called party is not a subscriber to said caller identification feature provided by said first network.

7. The invention as defined in 6 further including the step of routing said call from said first network to said second network.

8. The invention as defined in 6 wherein said call is placed to a personal telephone number and said method further comprises the step of:

repeating said making, supplying and withholding steps if said call is rerouted to a different telephone line in an attempt to complete said call to said called party.

9. Apparatus for providing call features for calls that pass through a plurality of communications networks of a respective plurality of telecommunication services providers, said apparatus comprising:

means for maintaining a feature subscription list in a first network of said plurality of networks, said list associating subscribers with various call features, some of said call features requiring information identifying the calling telephone line to be transmitted from said first network to another network of said plurality of networks;

means for receiving at said first network a call destined for a particular telephone line directly connected to a network other than said first network; and means for withholding for said call all information identifying the calling telephone line to another network of said plurality of communications networks as a function of both (i) an indication of the particular telephone line to which said received call is destined and (ii) said feature subscription list.

10. A method for use in providing inter-LATA caller identification comprising the steps of:

storing in the network of an interexchange carrier information indicating that particular called parties are to be provided with the inter-LATA caller identification feature;

comparing an indication of the called party of a call with said stored information; and supplying, during said call, signals indicating the identity of the calling party of said call from the network of said interexchange carrier to the network of at least one local exchange carrier only when said called party is one of said particular called parties for whom said inter-LATA caller identification feature is to be provided.

11. The invention as defined in claim 10 further including the step of routing said call from said interexchange carder to said local exchange carrier.

12. The invention as defined in claim 10 wherein said interexchange carrier receives information indicating that particular called parties are to be provided with the inter-LATA caller identification features from at least one other interexchange carrier.

13. The invention as defined in claim 12 wherein said information received from said at least one other interexchange carder is locked so that it is inaccessible by said interexchange carrier.

14. The invention as defined in claim 12 wherein said information received from said at least one other interexchange carrier is maintained independent of any interexchange carrier.

15. A method for use in providing an inter-LATA caller identification feature comprising the steps of:

storing in the network of an interexchange carrier information indicating that particular called parties are to be provided with the inter-LATA caller identification feature;

comparing an indication of the called party of a call with said stored information; and during said call, causing said network of said interexchange carrier to suppress the supplying of signals indicating the identity of the calling party of said call from the network of said interexchange carrier to the network of any local exchange carrier only when the called party is not one of said particular called parties for whom said inter-LATA caller identification feature is to be provided.

\* \* \* \* \*